Patented Dec. 21, 1948

2,456,627

UNITED STATES PATENT OFFICE 2,456,627

METHOD FOR MAKING POLYSILOXANE RESINS

Charles D. Doyle, Schenectady, N. Y., assignor to General Electric Company, a corporation of New York No Drawing. Application November 21, 1945, Serial No. 630,137

4 Claims. (Cl. 260—46.5)

The present invention relates to novel polysiloxane resins and to a method of preparing such polysiloxanes. It is particularly concerned with an improved process of hydrolyzing mixtures of chlorosilanes having a hydrocarbon-to-silicon ratio greater than 1 and less than 1.5 and including a major portion of methylchlorosilanes.

It is well known that organohalogenosilanes, or mixtures thereof which may also contain some silicon tetrahalides, readily hydrolyze when mixed with water to form silanols which condense or can be caused to condense to form polysiloxanes. The ease with which the silanols condense is dependent on the nature of the organic radical or radicals. When all or substantially all of these radicals are methyl groups the rate of dehydration or condensation is so rapid that for all practical purposes the condensation of the silanols occurs simultaneously with the hydrolysis of the chlorosilanes. Because both reactions occur instantaneously, the hydrolysis of methylchlorosilanes containing a sufficient number of chlorine atoms attached to silicon to form heat-hardenable products by mixing them with water results in the formation of insoluble gels which cannot be used in the manufacture of useful resinous compositions or in the formation of products of low average molecular weight rather than the high average molecular weight products sought in the preparation of resinous products in general.

Various methods have been devised for controlling the hydrolysis reaction and the earlier attempts along this line had for their principal object the prevention of gel formation during hydrolysis. However, as more and more knowledge accumulated concerning the various methods of hydrolysis, it became apparent that certain methods not only permitted the carrying out of the hydrolysis without using ice or ice-water mixtures for the more readily hydrolyzable chlorosilanes but also resulted in the formation of polysiloxanes having properties markedly different than those of the earlier known polysiloxanes which had the same general formula and were prepared from the same chlorosilane mixtures. It thus appears that the polysiloxanes, particularly those obtained by the cohydrolysis and co-condensation of mixtures of two or more chlorosilanes, will differ from one another, depending on the conditions of hydrolysis and condensation, in much the same way that other resinous materials, such as the phenol-formaldehyde condensation products, differ from one another depending upon the conditions under which the resin-forming reactions are caused to take place.

One of the earlier methods for controlling the hydrolysis of methylchlorosilanes is described in Rochow Patent 2,258,218 and comprises dissolving the chlorosilane mixture in ether and adding the resultant solution to ice or a mixture of ice and water. Another process is described and claimed in the copending application Serial No. 455,617 filed August 21, 1942 (now U. S. Patent 2,398,672, issued April 16, 1946) in the name of Robert O. Sauer and assigned to the same assignee as the present invention. The Sauer process comprises the solution of the chlorosilanes in a solvent such as toluene and the addition to this solution to a mixture comprising water and a higher alcohol such as butanol. Although the prior methods resulted in the formation of liquid, heat-hardenable products, they also involved certain disadvantages. Large volumes of solvents were usually necessary and in some cases the resinous products possessed poor craze resistance. Certain of the methods did not lend themselves either to the easy separation of the solvents or the recovery of the hydrogen chloride by-product, both of which are essential in any large scale commercial project.

Another process which was found to produce polysiloxane resins of improved hardness and stability is described and claimed in the copending application Serial No. 630,134 filed concurrently herewith in the name of Harry F. Lamoreaux and assigned to the same assignee as the present invention. Briefly described that process comprises the addition of a chlorosilane mixture containing a major portion of methylchlorosilanes to a hydrolysis medium comprising a mixture of water, a solvent of the glycol polyether type, such as dioxane, bis-(beta-ethoxyethyl) ether or ethylene glycol diethylether and a hydrocarbon solvent such as mineral spirits having a boiling point substantially above that of the polyether, the hydrolysis being carried out under gentle reflux temperatures.

The present invention is based on the discovery that the presence of high boiling hydrocarbon, water-immiscible solvent in the hydrolysis medium is not necessary and that polysiloxane resins having improved properties can be obtained by the addition of a mixture of chlorosilanes containing a major portion of methylchlorosilanes to a hydrolysis medium consisting of bis (beta-ethyloxyethyl) ether or ethylene glycol diethyl ether and water while maintaining the temperature of the hydrolysis medium above room temperature but not exceeding reflux temperatures during at least a major portion of the hydrolysis. The omission of the mineral spirits or the like from the hydrolysis medium results directly in an overall reduction in the cost of the process in that larger amounts of chlorosilanes may be hydrolyzed per given volume of hydrolysis equipment and the polyether can be recovered and reused more easily than is the case when the hydrocarbon solvent is also present in the hydrolysis medium.

The chlorosilane mixtures employed in the present invention are those containing major proportions of the methylchlorosilanes, methyltrichlorosilane forming a major proportion of the methylchlorosilane component of the chlorosilane mixture. In addition to the methylchlorosilanes there may also be present various other alkyl chlorosilanes or aryl chlorosilanes such as ethyl, propyl, butyl, allyl, phenyl, etc., chlorosilanes, the overall organo-to-silicon ratio of the chlorosilane mixture being at least 1 and less than about 1.5, preferably from 1.2 to 1.4. In general at least 75 per cent of the chlorosilane mixtures will consist of methylchlorosilanes.

In carrying the present invention into effect a mixture of bis-(beta-ethoxyethyl) ether and water in an amount at least equal to, but not exceeding by more than 40 per cent, that calculated as necessary for conversion of the chlorosilane mixture to polysiloxanes is placed in a glass container provided with a reflux condenser, is then preferably heated to reflux temperatures, and the chlorosilane mixture is added to the slowly agitated hydrolysis medium until a substantial evolution of hydrogen chloride is obtained. Thereafter the rate of addition of the chlorosilane mixture is preferably adjusted to obtain maximum hydrogen chloride evolution with minimum solvent entrainment. After all of the chlorosilanes have been added the resultant mixture is heated under distillation conditions to a temperature of about 110 degrees C. until no more evolution of hydrogen chloride is noted. The temperature is then again increased sufficient to remove substantially all of the polyether and to leave a practically solvent-free resin suitable for use in the various coating and other applications for which polysiloxane resins have previously been employed.

As will be pointed out more fully hereinafter, further cooking of the resin in the presence or absence of a solvent and under non-oxidizing conditions will produce a faster curing product. In order that those skilled in the art may better understand how the present invention may be carried into effect, the following illustrative examples are given:

Example 1

Fifty grams water and 500 g. bis-(beta-ethoxyethyl) ether were placed in a one-liter 3-neck round bottom flask equipped with a sealed stirrer, a hemispherical heating mantle and a draw-off tube at the bottom. Feeding of the chlorosilanes was accomplished under air pressure through a separatory funnel whose tip extended below the surface of the charge in the flask. Vapors were taken off through a vigreaux column, a 12 bulb condenser and a hydrogen chloride absorber in series. Condensate was taken off through a clamp-controlled by-pass arrangement under the vigreaux column and collected in a closed receiver having a draw-off tube at the bottom. The charge was slowly agitated (200 R. P. M.) by means of a small T stirrer and 250 g. of a methylchlorosilane mixture consisting of 80 parts methyltrichlorosilane and 20 parts dimethyldichlorosilane were added in 13 to 14 minutes as follows: rapid stream until charge cleared, rapid drops until heat temperature steadied at 50 degrees C. ± 5 degrees, stream adequate thereafter to maintain maximum hydrogen chloride evolution with minimum solvent entrainment. The heater was then turned on full and distillation begun. After approximately 35 minutes and at a head temperature of 95–110 degrees C. hydrogen chloride ceased coming over. At 115 degrees C. the by-pass was opened and nitrogen at a pressure of 1–2 cm. mercury was swept through the system and rapid distillation was continued for approximately 45 minutes to obtain a nearly solvent-free resin. The resin was then cooked with stirring at 160–170 degrees C. for at least one-half hour to a 20 second cure (at 200 degrees C.). It was then cut with 75 g. 30 degree xylol, stirred for 5 minutes with 1–2 g. carbon black and filtered through diatomaceous earth.

After filtration, this resin was found to have a slow cure (over 1 minute) and to be partially thermoplastic (soft at 150 degrees C.). But the resin was tougher, apparently contained longer molecules, i. e., was more viscous, and was more compatible with other materials than a comparable resin prepared from the same mixture of chlorosilanes by the process described in the above-mentioned Sauer application. The hydrogen chloride collected was practically pure. The recovered distillate was found to be reusable for further hydrolysis after adjustment for water content.

The incorporation of small amounts of diphenyldichlorosilane into the methylchlorosilane mixture produces a more stable hydrolysis product which can be cooked for longer periods after removal of the polyether to form more viscous and more nearly cured liquid products.

The following examples illustrate the preparation of methylphenyl polysiloxanes having a phenyl-to-methyl ratio not exceeding 0.25.

Example 2

A mixture of 47 g. water and 500 g. bis-(beta-ethoxyethyl) ether were placed in the apparatus described in Example 1. A blend of 191 g. methyl trichlorosilane, 46 g. dimethyl dichlorosilane and 13 g. diphenyl dichlorosilane was added with slow stirring of the hydrolysis medium (200 R. P. M.) as follows:

| | Minutes |
|---|---|
| Addition time until charge cleared | 2 |
| Addition time for balance of chlorosilane blend | 23 |

The charge was then rapidly distilled to 115 degrees C. head temperature, after which the by-pass was opened and nitrogen swept through to complete distillation to resin base. The resin was then cooked at 200–220 degrees C. for 2 hours to a 7 second cure (200 deg. C.) and a heavy string. After the charge temperature had dropped to 170 degrees C. the resin was cut with 75 g. petroleum spirits, stirred with 1 g. carbon black (5 minutes at 150 deg. C.) and filtered through diatomaceous earth. The resulting resin was slow curing and more thermoplastic than that obtained with methyl chlorosilanes alone, but its solution was more viscous.

Example 3

A mixture of 1347 g. water and 15,000 g. bis-(beta-ethoxyethyl)ether which had been reclaimed from previous hydrolyses was placed in a hydrolyzer having a volume of 30 liters and provided with the same type of equipment described in Example 1. A chlorosilane mixture consisting of 5737 g. methyltrichlorosilane, 1388 g. dimethyldichlorosilane and 375 g. diphenyldichlorosilane was added rapidly to the slowly agitated charge until the liquid temperature reached 60 degrees C.

and violent hydrogen chloride evolution had commenced. The chlorosilane addition rate was then controlled to obtain maximum hydrogen chloride evolution rate with minimum solvent entrainment. The total additional time was 38 minutes. A total of 355 g. of entrained liquid condensed out and was returned to the hydrolyzer. The resultant charge was distilled to 90 degrees C. liquid temperature to remove residual hydrogen chloride after which the distillate was by-passed into a receiver for residual water to a liquid temperature of 115 degrees C. Air was then blown through the equipment at 1 to 2 cm. Hg to a liquid temperature of 160 degrees C. A total of 14,819 g. distillate consisting in the main of the polyether was collected over a period of 2 hours and 24 minutes. The residual resin was cut in 900 g. petroleum spirits to form a varnish.

Preferably the hydrolysis medium is maintained at an elevated temperature in the neighborhood of gentle reflux temperatures during the entire time the chlorosilane mixture is being added thereto. This practice has been found to result in the production of hydrolyzates having higher cures and less subject to premature gelation than when the hydrolysis medium is at lower room temperatures during part of the time. The following example illustrates this technique as applied to a chlorosilane mixture having a hydrocarbon-to-silicon ratio of 1.35 and a phenyl-to-methyl ratio of 0.25.

Example 4

A mixture of 1222 g. methyltrichlorosilane, 348 g. dimethyldichlorosilane and 430 g. diphenyldichlorosilane was divided into two 1000 g. portions, one portion was hydrolyzed without application of heat (case A) and the other was hydrolyzed hot (case B).

*Case A.*—1000 g. of the chlorosilane blend was added to a rapidly stirred mixture of 165 g. water and 1000 g. reclaimed bis-(beta-ethoxyethyl) ether over the following time-temperature cycle:

| Time, min. | Hydrolysis Medium Temp., Deg. C. |
|---|---|
| 0 | 25. |
| 4 | 68 (max.). |
| 36 | 40 (min.). |

The charge foamed heavily toward the end of the hydrolysis period and during the early refluxing period. The charge was refluxed to 90 degrees C. charge temperature in 39 minutes and distilled to 170 degrees C. in 48 minutes. The product cured in 118 seconds at 200 degrees C.

*Case B.*—1000 g. of the chlorosilane blend was added to a rapidly stirred mixture of 165 g. water and 1000 g. reclaimed bis-(beta-ethoxyethyl) ether over the following time-temperature cycle:

| Time, min. | Hydrolysis Medium Temp., Deg. C. |
|---|---|
| 0 | 25. |
| 4 | 68 (max.) heat applied. |
| 43 | 60 (min.). |

The charge was refluxed to 90 degrees C. in 17 minutes and distilled to 170 degrees C. in 46 minutes without foaming. The product cured in 282 seconds at 200 degrees C.

The upper limit of hydrolysis temperature is the temperature of incipient appreciable solvent refluxing. In the case of bis-(beta-ethoxyethyl) ether this limit is approximately 70 degrees C.

While the increased hydrogen chloride evolution during hot hydrolysis causes the duration of the hydrolysis period to be increased, the subsequent refluxing period is materially decreased. Thus the overall time consumption is decreased slightly during the critical hydrolysis and refluxing periods when considerable amounts of hydrogen chloride are present in the charge.

What I claim as new and desire to secure by Letters Patent of the United States is:

1. The process of making resinous polysiloxanes which comprises adding a mixture of hydrocarbon chlorosilanes having a hydrocarbon-to-silicon ratio greater than 1 and less than about 1.5 and containing a major portion of methyltrichlorosilane to a hydrolysis medium consisting of water and an ether solvent selected from the class consisting of bis (beta-ethoxyethyl) ether and ethylene glycol diethyl ether at a temperature above room temperature but not exceeding reflux temperatures during at least a major portion of the hydrolysis, the amount of water present in said medium being between 1 and 1.4 times the amount calculated as necessary to convert the chlorosilanes to the corresponding polysiloxanes.

2. The process of making resinous polysiloxanes which comprises adding a mixture of hydrocarbon chlorosilanes having a hydrocarbon-to-silicon ratio greater than 1 and less than 1.5 and containing a major portion of methyltrichlorosilane to a hydrolysis medium consisting of water and a polyether solvent selected from the class consisting of bis (beta-ethoxyethyl) ether and ethylene gylcol diethyl ether at a temperature above room temperature but not exceeding reflux temperatures during at least a major portion of the hydrolysis, the amount of water present in said medium being between 1 and 1.4 times the amount calculated as necessary to convert the chlorosilanes to the corresponding polysiloxanes and heating the resultant products to temperature sufficient to remove substantially all of the polyether solvent.

3. The process of making resinous polysiloxanes which comprises adding a mixture of methylchlorosilanes having a methyl-to-silicon ratio greater than 1 and less than 1.5 and containing a major portion of methyltrichlorosilane to a hydrolysis medium consisting of water and an ether solvent selected from the class consisting of bis (beta-ethoxyethyl) ether and ethylene glycol diethyl ether at a temperature above room temperature but not exceeding reflux temperatures during at least a major portion of the hydrolysis, the amount of water present in said medium being between 1 and 1.4 times the amount calculated as necessary to convert the chlorosilanes to the corresponding polysiloxanes.

4. The process of making resinous polysiloxanes which comprises adding a mixture of methylchlorosilanes having a methyl-to-silicon ratio greater than 1 and less than 1.5 and containing a major portion of methyltrichlorosilane to a hydrolysis medium consisting of water and an ether solvent selected from the class consisting of bis (beta-ethoxyethyl) ether and ethylene glycol diethyl ether at a temperature above room temperature but not exceeding reflux temperatures during at least a major portion of the hydrolysis, the amount of water present in said medium being between 1 and 1.4 times the amount calculated as necessary to convert the chlorosilanes to the corresponding polysiloxanes and heating the resultant products to temperature sufficient to remove substantially all of the ether solvent.

CHARLES D. DOYLE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,383,827 | Sprung | Aug. 28, 1945 |
| 2,398,672 | Sauer | Apr. 16, 1946 |

OTHER REFERENCES

Carbide and Carbon Chemicals Corp.: "Synthetic Organic Chemicals," 10th edition, 1940, page 2.